P. H. VANDER WEYDE.
Filter.
No. 60,445.
Patented Dec. 11, 1866.
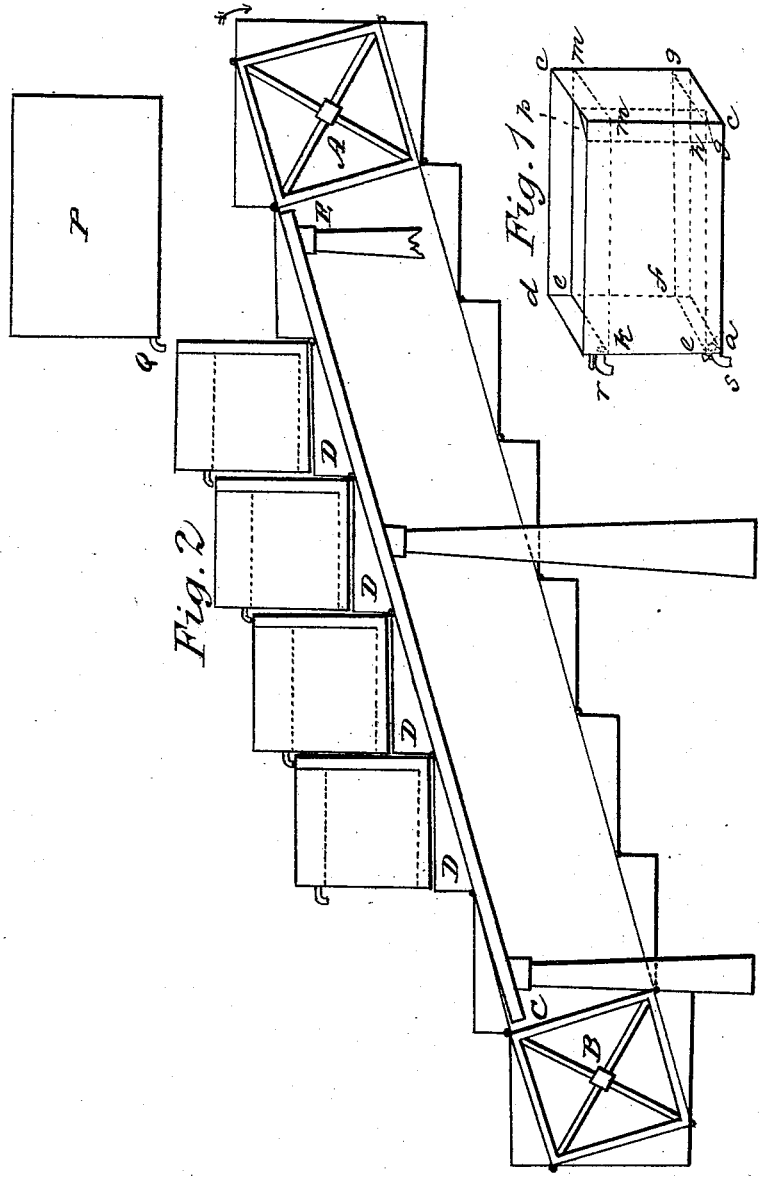

United States Patent Office.

IMPROVED CONTINUOUS PERCOLATOR AND FILTERING MACHINE.

P. H. VANDER WEYDE, OF PHILADELPHIA, PENNSYLVANIA.

Letters Patent No. 60,445, dated December 11, 1866.

---

The Schedule referred to in these Letters Patent and making part of the same.

---

Be it known that I, P. H. VANDER WEYDE, of Philadelphia, State of Pennsylvania, have invented an improved Percolator and Filtering Machine, which, besides possessing all the advantages in regard to economy of material of all other percolators, possesses also the following new advantages, derived from the system here adopted of percolating upward.

1. An equal ascent of the liquid, which in a downward acting percolator, always by preference runs in the first channel it happens to make for itself, and never touches equally all the material, serving to be extracted by percolation or as a filter.

2. Filtered liquids being generally lighter, the impurer parts will naturally move downward to the bottom of the filter; in downward acting filters, the purest and lightest parts of the liquid are compelled to descend, contrary to their nature.

3. As the liquid moves equally through the whole mass of material, it is unnecessary to limit the rapidity of its exit, as must be done in downward filters and percolators, and the operation is more rapid.

4. It is much easier to heat the different parts with a gas or other flame, or with steam from below, than is the case with downward acting percolators with perforated bottoms.

The following is a correct description of each part, reference being had to the adjoined drawing.

Figure 1 represents the interior arrangement of each compartment separately.

Figure 2 represents them in profile, as they are combined to a system for continuous percolations or filterings.

$a\ b\ c\ d$, fig. 1, is a square box, of tin or other suitable material, with two horizontal partitions $e\ f\ g\ h$, and $k\ l\ m\ n$, between which the solid material is placed. One corner of the box is separated by a piece $p\ q$, thus cutting off a triangular prism which at the bottom communicates with the interior, and serves to admit the liquid from above by $p$; this will flow over the bottom $a\ b$, and, by hydraulic pressure of the column $p\ q$, ascend through the solid material between $e\ f\ g\ h$ and $k\ l\ m\ n$, and discharge by the stopcock $r$ in the part $p$ of the next vessel, as is indicated in fig. 2. S is a stop-cock below, to discharge the liquid contents of the upper box (fig. 2) when the solid material is exhausted. The plates $e\ f\ g\ h$ and $k\ l\ m\ n$ are perforated over their whole surface, and not permanently attached, so that they may be removed for the purpose of cleaning. Fig. 2 represents the whole system, as combined for the working of it. It may have any height, and consists of as many separate percolators as is found necessary to exhaust the material used. C E is a kind of inclined track, on which are sliding desk-like pieces D D D, made at such an angle that the vessels placed on the top of them are horizontal, and those pieces D D are attached to one another with a hinge, in order to turn round the corners of the wheels A and B; each compartment or vessel is placed with its triangular corner space $p\ q$ (fig. 1) under the stop-cock $r$ of the preceding higher one. P (fig. 2) is the general feeding tank, into which the provision of liquid is placed, and runs through the stop-cock Q into the uppermost vessel. There are so many of those vessels necessary, that when the liquid flowing out of the last or lowest vessel is no more satisfactory, the first or upper one contains only exhausted solid material, and may be removed; when this has been done, the square wheel A is turned by means of a crank, in the direction indicated by the arrow, for one quarter of a revolution, and the whole of the vessels on the incline will then slide upward and shift one place, so that the second will become the first or uppermost, and at the other end will be room for the addition of a fresh one on the lowest step. The bottoms of the vessels may be heated by gas burners, steam, or otherwise.

What I claim, and wish to secure by Letters Patent, is—

1. The above described upward-acting percolators, into each of which the liquid enters below the solid material, and overflows at the top into the next one.

2. The placing of them on steps, so that the liquid flows from the more exhausted solid material into that which is later added, coming in its course all the time in contact with fresher material.

3. The manner described of displacing a series of any number of them on the inclined rail-track, by turning the wheels A and B, in order to remove only the vessel above containing exhausted solid material, and supplying one with fresh material at the lower end, without interrupting the operation, thus effecting a saving in material as well as of time.

In testimony whereof, I have signed my name to this specification, in the presence of two subscribing witnesses.

P. H. VANDER WEYDE.

Witnesses:
J. W. LASSERRE,
B. S. HEDRICK.